US009689500B2

(12) United States Patent
Coolidge

(10) Patent No.: US 9,689,500 B2
(45) Date of Patent: Jun. 27, 2017

(54) PRESSURE LIMITED FLOW SPOOL

(71) Applicant: Parker-Hannifin Corporation, Cleveland, OH (US)

(72) Inventor: Gregory T. Coolidge, Elyria, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 7 days.

(21) Appl. No.: 14/764,036

(22) PCT Filed: Jan. 31, 2014

(86) PCT No.: PCT/US2014/014176
§ 371 (c)(1),
(2) Date: Jul. 28, 2015

(87) PCT Pub. No.: WO2014/121088
PCT Pub. Date: Aug. 7, 2014

(65) Prior Publication Data
US 2015/0362084 A1 Dec. 17, 2015

Related U.S. Application Data

(60) Provisional application No. 61/759,183, filed on Jan. 31, 2013.

(51) Int. Cl.
*F16K 11/07* (2006.01)
*F15B 11/042* (2006.01)
(Continued)

(52) U.S. Cl.
CPC ............ *F16K 11/07* (2013.01); *F15B 11/042* (2013.01); *F15B 13/0402* (2013.01);
(Continued)

(58) Field of Classification Search
CPC ................ F15B 11/042; F15B 13/0402; F15B 2013/008; F16K 11/07; F16K 11/0708;
(Continued)

(56) References Cited

U.S. PATENT DOCUMENTS 6,158,462 A * 12/2000 Kashiwagi ............ E02F 9/2267
137/596
6,397,890 B1 6/2002 Mickelson et al.
2008/0230127 A1 9/2008 Marly

FOREIGN PATENT DOCUMENTS

EP 0405113 1/1991

OTHER PUBLICATIONS

International Search Report and Written Opinion for corresponding Patent Application No. PCT/US2014/014176 dated Jun. 12, 2014.
(Continued)

*Primary Examiner* — R. K. Arundale
*Assistant Examiner* — Kelsey Rohman
(74) *Attorney, Agent, or Firm* — McDonnell Boehnen Hulbert & Berghoff LLP

(57) ABSTRACT

A valve includes a pressure limiting flow spool disposed in a valve body. The spool is movable in a first direction from a first position to a second position and in the first direction from the second position to the third position. The valve includes an inlet and a first outlet. The first position is a closed position preventing flow from the inlet to the first outlet, the second position is a maximum flow position having a maximum flow capacity from the inlet to the first outlet, and the third position is a pilot flow position having a reduced flow capacity from the inlet to the first outlet smaller than the maximum flow capacity.

20 Claims, 16 Drawing Sheets

(51) Int. Cl.
*F15B 13/04* (2006.01)
*F15B 13/00* (2006.01)

(52) U.S. Cl.
CPC ..... *F16K 11/0708* (2013.01); *F15B 2013/008* (2013.01); *Y10T 137/8671* (2015.04); *Y10T 137/86879* (2015.04)

(58) Field of Classification Search
CPC ..... Y10T 137/86734; Y10T 137/86879; Y10T 137/8671; Y10T 137/87169
USPC ................................ 137/625.69, 625.3, 596
See application file for complete search history.

(56) References Cited

OTHER PUBLICATIONS

Written Opinion for corresponding Patent Application No. PCT/US2014/014176 dated Mar. 26, 2015.

\* cited by examiner

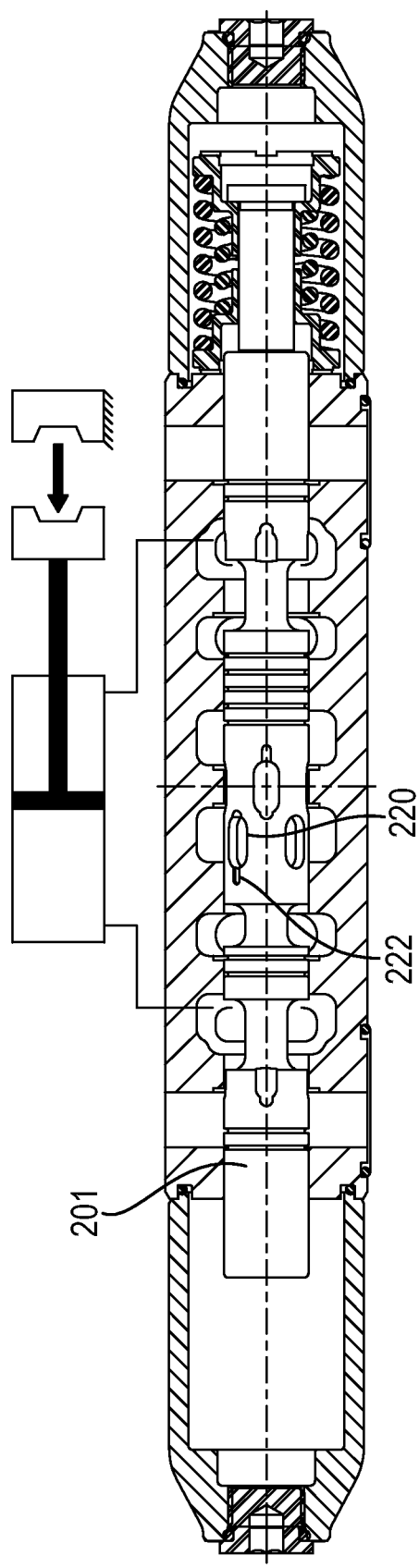

PRESSURE LIMITED FLOW SPOOL

This application is a national phase of International Application No. PCT/US2014/014176 filed Jan. 31, 2014 and published in the English language, which claims the benefit of U.S. Provisional Application No. 61/759,183 filed Jan. 31, 2013, which is hereby incorporated herein by reference.

FIELD OF INVENTION

The present invention relates generally to pressure limitation, and more particularly to a valve spool that limits flow during maximum pressure conditions.

BACKGROUND

In order to protect hydraulic devices connected at a work port, typically a pressure relief valve is placed in parallel with the workport. The pressure relief valve typically partially or totally exhausts to tank flow going to the workport during pressure limitation. During a deadheaded workport condition, the device consumes all and potentially significant hydraulic system flow going to the workport (typically between 5.0 gpm and the valve rated pump flow, such as 32 gpm) and not used by the hydraulic device while limiting workport pressure. This pressure relief valve may also protect the workport by relieving shock pressures entering the workport. It is commonly used in Load Sense, Post Compensated, Pre Compensated, Open Center, and Closed Center control valves.

SUMMARY OF INVENTION

The flow vented by the pressure relief valve cannot be beneficially used by other system functions and creates heat which results in poor energy efficiency. Therefore, described herein is a pressure limited flow spool that limits the amount of flow consumed by a workport section during a deadheaded workport condition.

According to one aspect of the invention, a pressure limiting flow spool assembly includes a valve body having a first fluid chamber separated from a second fluid chamber by a dividing portion, and a bore fluidly connected to the first and second passages and adjacent the dividing portion; and a pressure limiting flow spool disposed in the bore and movable between a first and a second axial position in the valve body; wherein in the first axial position, the spool forms with the dividing portion a first fluid passageway fluidly connecting the first fluid chamber with the second fluid chamber, the first fluid passageway having a maximum flow capacity between the first and second chambers, and wherein in the second axial position, the spool forms with the dividing portion a second fluid passageway fluidly connecting the first fluid chamber with the second fluid chamber, the second fluid passageway having a pilot flow capacity less than the maximum flow capacity.

Optionally, the spool includes a first recess on a radially outer surface of the spool, and a second recess on the radially outer surface of the spool connected to the first recess, and wherein the first recess forms the first fluid passageway and the second recess forms the second fluid passageway.

Optionally, the first recess is radially deeper than the second recess.

Optionally, the first recess is circumferentially wider than the second recess.

Optionally, the first chamber includes a valve inlet of the spool assembly.

Optionally, the second chamber includes a pressure compensator.

Optionally, the pressure limiting flow spool assembly further includes a spool detent mechanism configured to hold the spool in the second position.

Optionally, the spool is moveable to a third position fluidly disconnecting the first and second chambers.

Optionally, the valve body includes a feed chamber and a first workport chamber and wherein the spool includes a first workport passage fluidly connecting the feed chamber to the first workport chamber when the spool is in the first or second position.

Optionally, the spool is moveable to fourth and fifth axial positions. In the fourth axial position, the spool forms with the dividing portion a third fluid passageway fluidly connecting the first fluid chamber with the second fluid chamber, the third fluid passageway having the maximum flow capacity between the first and second chambers, and in the fifth axial position, the spool forms with the dividing portion a fourth fluid passageway fluidly connecting the first fluid chamber with the second fluid chamber, the fourth fluid passageway having the pilot flow capacity.

Optionally, the valve body includes a second workport chamber and wherein the spool includes a second workport passage fluidly connecting the feed chamber to the second workport chamber when the spool is in the fourth or fifth position.

Optionally, the pilot flow capacity is approximately 0.9 gallons per minute.

Optionally, the maximum flow capacity to pilot flow capacity is a ratio of between approximately 4:1 to 36:1.

Optionally, the second position is a deadhead position.

Optionally, the pressure limiting flow spool assembly includes a pressure compensator fluidly connected between the second chamber and the third chamber.

According to another aspect of the invention, a pressure limiting flow spool includes a main spool body with a radial outer surface; a first recess on the radially outer surface having a first fluid handling capacity; and a second recess on the radially outer surface and fluidly connected to the first recess, the second recess having a second fluid handling capacity; wherein the first fluid handling capacity is greater than the second fluid handling capacity.

Optionally, the first recess is radially deeper than the second recess.

Optionally, the first recess is circumferentially wider than the second recess.

Optionally, the pressure limiting flow spool further includes a third recess on the radially outer surface having a third fluid handling capacity; and a fourth recess on the radially outer surface and fluidly connected to the third recess, the fourth recess having a fourth fluid handling capacity, wherein the third fluid handling capacity is greater than the fourth fluid handling capacity.

Optionally, the third recess is radially deeper than the fourth recess.

Optionally, the third recess is circumferentially wider than the fourth recess.

Optionally, the first and third recesses are axially offset from each other.

Optionally, the second and fourth recesses are axially offset from each other.

Optionally, the second and fourth recesses do not axially overlap.

Optionally, the first and second recesses are circumferentially aligned.

Optionally, the third and fourth recesses are circumferentially aligned.

Optionally, the first and third recesses are circumferentially offset.

According to another aspect of the present invention, a hydraulic valve assembly includes a pressure limiting flow spool disposed in a valve body, the spool movable in a first direction from a first position to a second position and in the first direction from the second position to the third position; and an inlet and a first outlet; wherein the first position is a closed position preventing flow from the inlet to the first outlet, the second position is a maximum flow position having a maximum flow capacity from the inlet to the first outlet, and the third position is a pilot flow position having a reduced flow capacity from the inlet to the first outlet smaller than the maximum flow capacity.

Optionally, the spool is as described in any paragraph above.

Optionally, the valve includes a pressure compensator between the inlet and the outlet.

Optionally, the valve includes a second outlet; and wherein the spool is movable in a second direction from the first position to a fourth position and from the fourth position to the fifth position, wherein the fourth position is a maximum flow position having a maximum flow capacity from the inlet to the second outlet, and the fifth position is a pilot flow position having a reduced flow capacity from the inlet to the second outlet smaller than the maximum flow capacity.

The foregoing and other features of the invention are hereinafter described in greater detail with reference to the accompanying drawings.

BRIEF DESCRIPTION OF THE DRAWINGS

FIG. 12A-12C show a cross-section of components of an exemplary PLQ SPOOL system with an application example;

DETAILED DESCRIPTION

Figure 1:
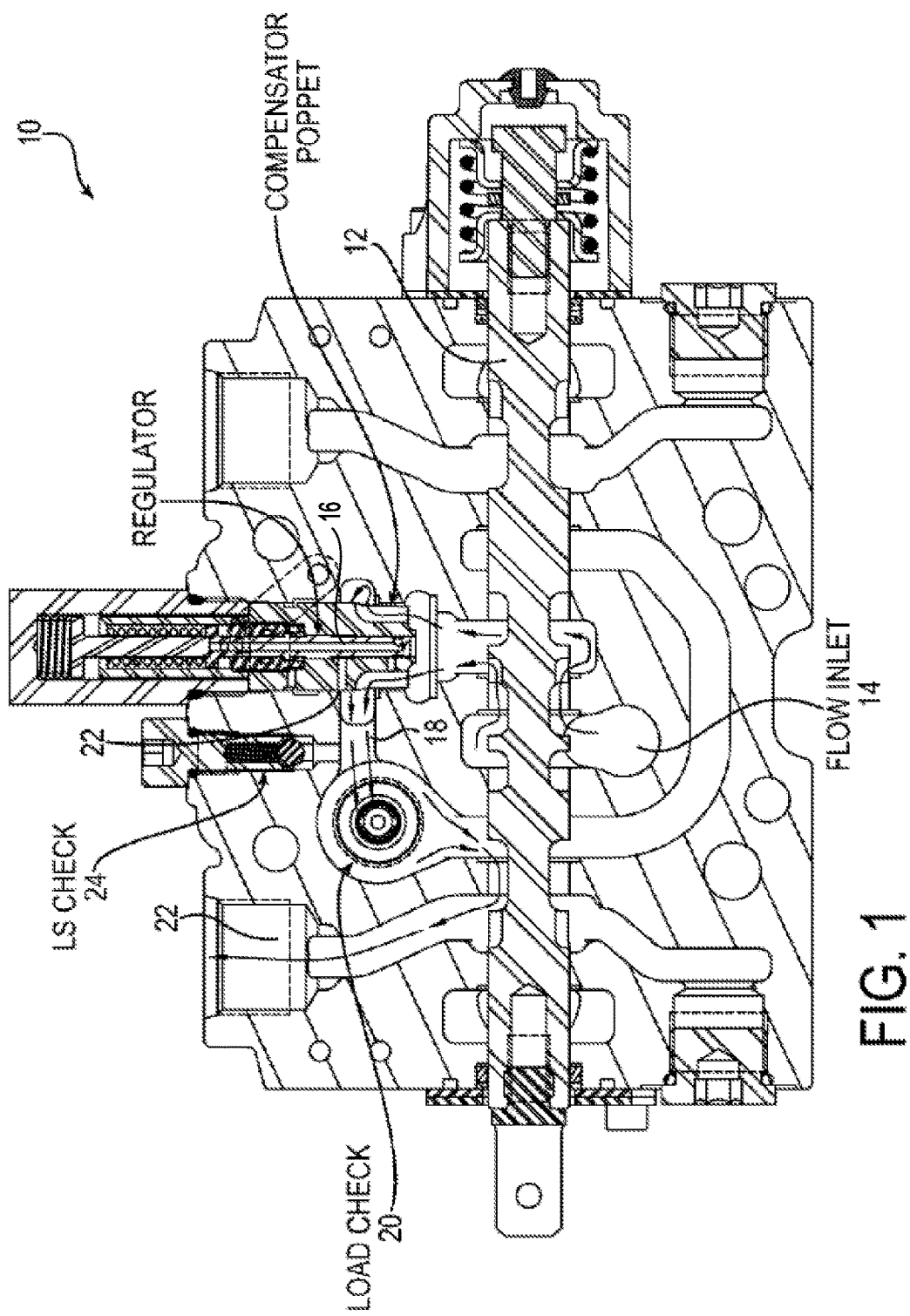
FIG. 1 shows a Flow Sharing Post Pressure Compensated Valve Worksection depicting the basic components and flow path for a PLQ SPOOL Worksection.

Other pressure relief methods are described below in comparison to exemplary pressure limited flow spools (PLQ SPOOL) which are detailed herein.

Conventional "System Load Sense Relief Valve"

A conventional system load sense relief valve is a device which is in parallel with the maximum load sense pressure signal. If a workport becomes deadheaded, then the workport pressure will be limited to the maximum system pressure dictated by the System Load Sense Relief Valve. This relief valve only consumes 0.75-1.00 gpm flow. It is commonly used in Load Sense, Post Pressure Compensated, and Pre Pressure Compensated control valves.

In contrast, an exemplary PLQ SPOOL worksection regulates pressure at a deadheaded workport at a value less than maximum system pressure. Since the PLQ SPOOL worksection and other functions can operate at a lower pressure value, energy efficiency is improved. If a system load sense relief valve regulates pressure at a deadheaded workport, then other functions will work at maximum system pressure expending unnecessary energy.

"Pre Pressure Compensated Control Valve with Pressure Limiter or Feed Reducer" Option A Pre Pressure Compensated Control Valve with Pressure Limiter or Feed Reducer device reduces pump output pressure to a preset value that is less than the maximum hydraulic system pressure. It works with a pre-load-sensing pressure-reducing type compensator to regulate workport pressure. Workport flow is the amount required to maintain the preset pressure value. These devices do not protect against shock pressures entering the workport so Full Flow or Clipper Pressure Relief Valves must be used. These devices are commonly used in Pre Pressure Compensated control valves. It is noted that a Pre Pressure Compensated valve does not have Flow Sharing capability.

A Pre Pressure Compensated valve will automatically assume a conserving low (pilot) quiescent flow pressure limiting state whereas an exemplary PLQ SPOOL must be manually actuated or have programmed actuation into pilot flow pressure limiting. Pre Pressure Compensated valves will automatically convert from a pressure limiting state to outputting a flow in the range of pilot to the flow demanded by the control spool to create the pressure limiter pressure setting if workport flow resistance is less than the pressure setting. A PLQ SPOOL worksection, in contrast to the Pre Pressure Compensated valve, can pressure limit and have flow sharing capability during pump flow over-demand.

Flow Sharing Post Pressure Compensated Control Valve with Pressure Limitation Options Flow Sharing Post Pressure Compensated control valve also has a Pressure Limited Flow (PLQ) feature that is Patent Pending per PCT/US2010/057555 and WO 2011/115647 A1, the disclosure of which is incorporated by reference herein in its entirety. PLQ will limit workport pressure to a preset value less than the maximum hydraulic system pressure using only pilot flow without negatively consuming system flow, causing heat generation, and wasting energy. It will automatically convert from a pressure limiting state to outputting a flow in the range of pilot to the flow demanded by the control spool to create the pressure limiter pressure setting or if workport flow resistance is less than the pressure setting. Any application that requires a constant force or torque can use PLQ.

Such a worksection will automatically assume a conserving low (pilot) quiescent flow pressure limiting state whereas an exemplary PLQ SPOOL must be manually actuated or have programmed actuation into pilot flow pressure limiting. PLQ will automatically convert from a pressure limiting state to outputting a flow in the range of pilot to the flow demanded by the control spool to create the pressure limiter pressure setting if workport flow resistance is less than the pressure setting.

A Flow Sharing Post Pressure Compensated control valve can be configured with a 4 GPM Maximum Flow Catalog Control Spool used with the Standard Workport relief valve. The 4 GPM spool is selected since that is the lowest maximum workport output flow. If the workport is deadheaded then the workport relief valve will exhaust the 4 GPM during pressure limitation.

However, 4 GPM may still be wasteful during pressure limitation and may not be adequate as Maximum workport output flow. With PLQ SPOOL, a "Maximum" workport output flow is available in addition to an energy saving "Pilot" flow used in the final pressure limited flow stage. The PLQ SPOOL includes a high "Maximum" flow (for example, 32 gpm) capacity generated by a low pressure differential. When fully actuated, the PLQ SPOOL system will limit workport pressure to a preset value less than the maximum hydraulic system pressure using only pilot flow without negatively consuming system flow, causing heat generation, and wasting energy.

PLQ SPOOL

Figure 2:
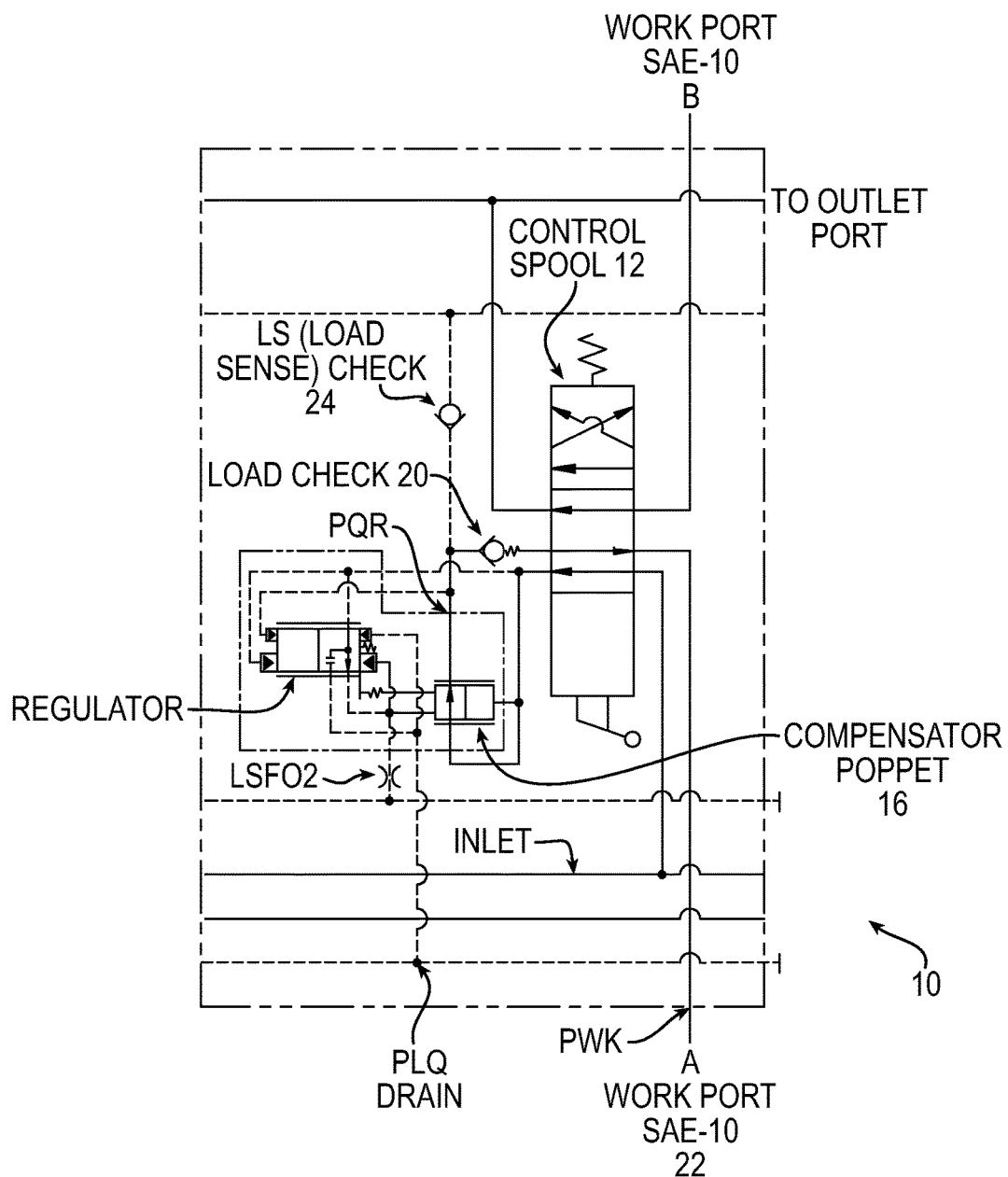
FIG. 2 shows a schematic of a Flow Sharing Post Pressure Compensated Valve Worksection.

Initially referring to FIGS. 1 and 2, the illustrated valve assembly 10 and schematic diagram show basic valve components and flow paths in a post-compensator arrangement.

The main control spool 12 is shown shifted to the right from a neutral or closed position. Hydraulic fluid flows from the inlet passage 14, across the spool to the pressure compensator poppet 16. The pressure compensator poppet is forced to shift upward. Fluid flows across the compensator poppet into the Qreg core (cast passage) 18 to the load check 20. Load check poppet is forced open and flow progresses down across the spool and up to Workport "A" 22. Flow volume is dictated by the control spool Inlet to Qmet area that is bounded by the pressure differential of Pin−Pqm. Qmet area is located in the flow path between the spool and compensator. Workport (Pwk) and Qreg (Pqr) pressures are a function of the resistance to flow at Workport "A". Pqr pressure is sensed by the Load Sense (LS) Check 24. The LS Check system resolves the Pqr pressures of multiple worksections into the maximum Qreg pressure (Pqr max) which is also the conventional Maximum Load Sense (LS) pressure. Pqr max pressure is sent to the "load sensing flow and margin pressure source" (LS pump or fixed pump plus bypass compensator) and individual worksection post pressure compensator spring chambers. Pqr max pressure acting on a compensator poppet causes it to resist and compensate flow in the conventional post compensation manner. Qreg= (regulated flow and pressure downstream of compensator: "Q"=flow, "reg"=regulated). Qmet=(metered flow & pressure upstream of compensator: "Q"=flow, "met"=metered).

Figure 3:
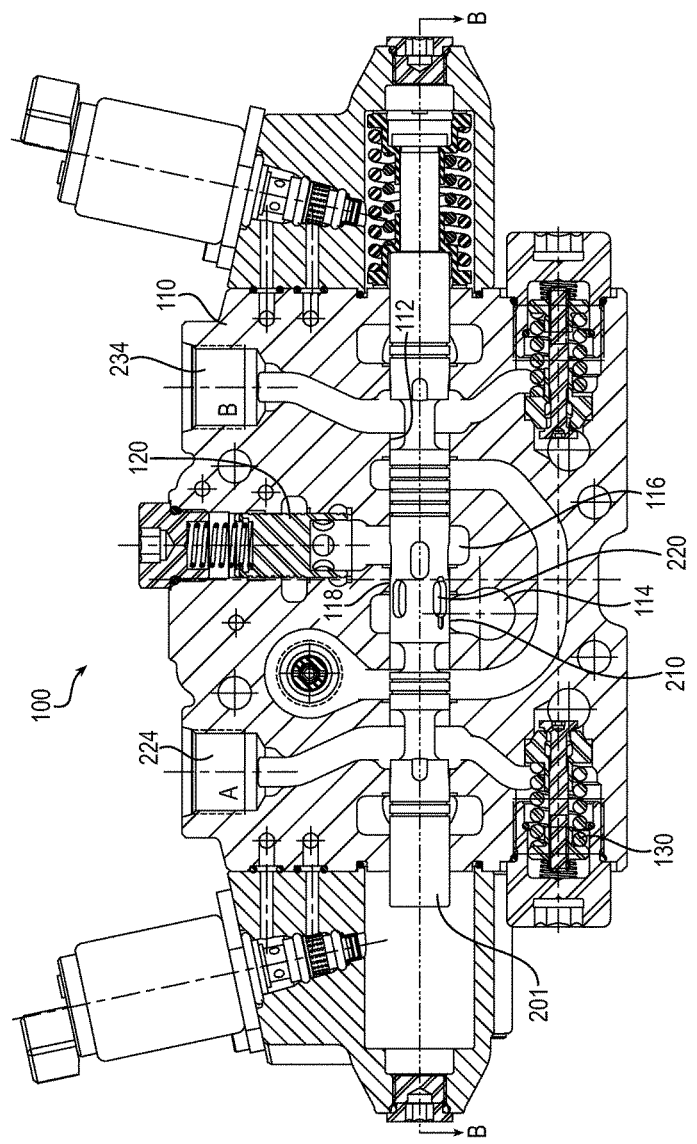
FIG. 3 shows an exemplary PLQ SPOOL Worksection including the PLQ SPOOL system components.

An exemplary PLQ SPOOL is a worksection pressure limiting system 100. System components include the worksection control spool 201, flow sharing post pressure compensator 120, and workport relief valve 130. Referring now to FIG. 3, the worksection control spool 201 position to housing 110 bore 112 relationship is uniquely designed whereby a "Maximum" workport output flow is available in addition to a conserving "Pilot" flow used in the final pressure limited flow stage. High "maximum" flow (for example, 32 gpm) capacity may be generated by a low pressure differential. Both the maximum and pilot flows can be the same or different for the respective "A" and "B" work positions. A PLQ SPOOL control spool can have PLQ SPOOL functionality at "A" and "B" or at either one of "A" or "B" with a standard configuration at the other position. For non-exhaustive examples of possible configurations, please refer to the hydraulic schematics of FIGS. 5-11.

The valve housing/body 110 may have an inlet fluid chamber 114 separated from a fluid metering fluid chamber 116 by a dividing portion 118. The chambers may be fluidly connectable to each other via the bore 112.

The spool 201 forms with the dividing portion 118 a fluid passageway fluidly connecting the inlet chamber with the fluid metering chamber. The fluid passageway can have a maximum flow capacity between the chambers or a pilot flow capacity, depending on the positioning of the spool.

Figure 4:
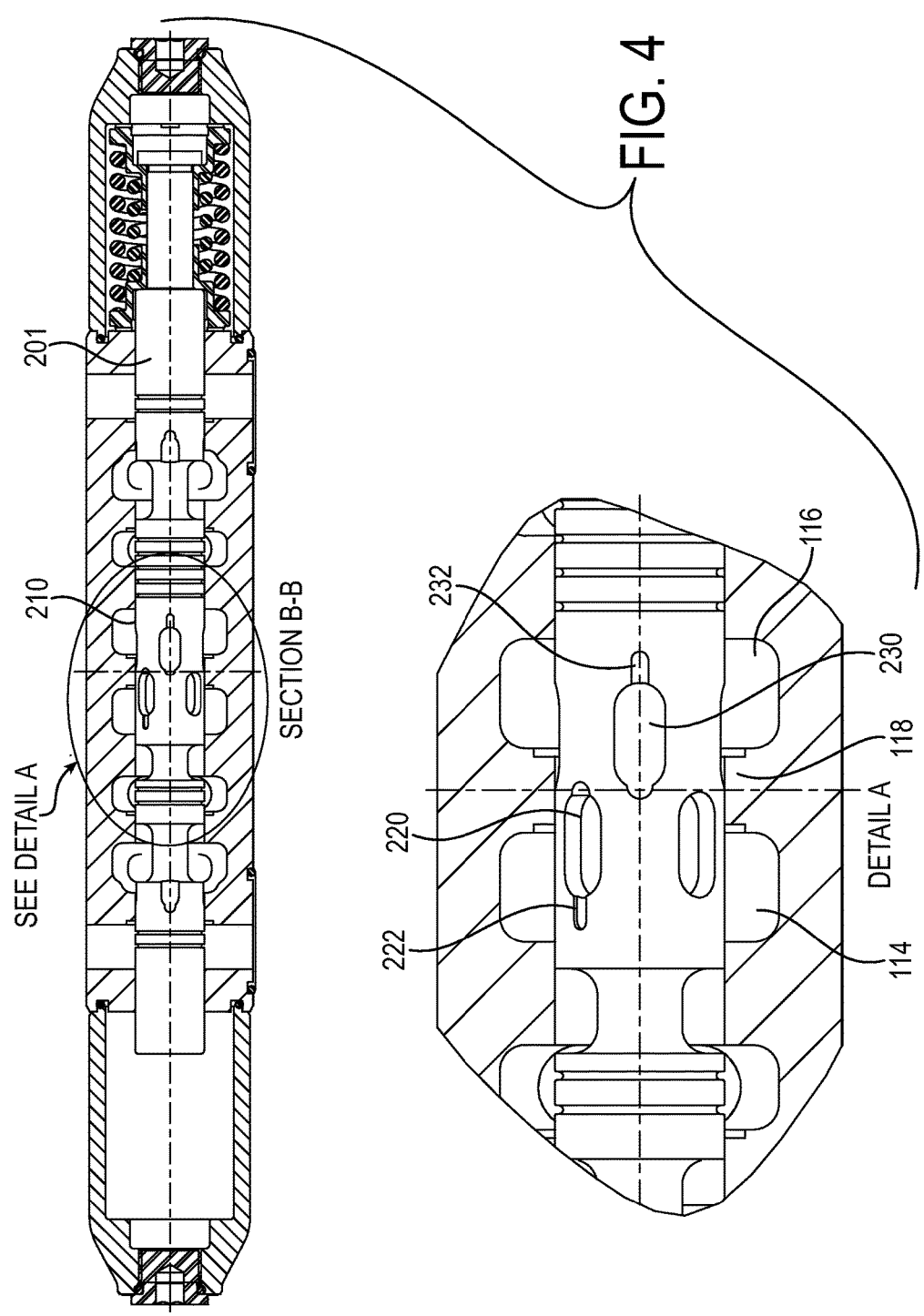
FIG. 4 shows an exemplary PLQ Spool in full with an inset detail of the notches.

Referring now to FIG. 4 in particular, the spool 201 main body has a radial outer surface 210. A first recess 220 on the radially outer surface has a first fluid handling capacity as described above, to provide a maximum flow. Attached to the first recess is a second recess 222 on the radially outer surface. The second recess 222 has a second fluid handling capacity to produce the lower pilot flow.

Exemplary recesses (or "notches") are shown with the first recess 220 being radially deeper than the second recess 222. Also, the first recess 220 is shown as being circumferentially wider than the second recess 222. These recesses are used, for example, when the valve is providing fluid to workport A 224.

When providing fluid to optional workport B 234, a third recess or notch 230 may be provided on the radially outer surface having a third fluid handling capacity. A fourth recess 232 on the radially outer surface may be fluidly connected to the third recess and have a fourth fluid handling capacity. Again, the fluid handling capacities may be "maximum" and "pilot", respectively. These flows for the workport B may be the same as or different from the fluid capacities of the first and second recesses.

Again, the exemplary pilot recess 232 is shown as being both radially shallower and circumferentially narrower than the main recess 230, although other arrangements are possible.

Exemplary recess pairs are shown axially and circumferentially offset from each other, although other arrangements are possible.

Turning now to FIGS. 5-11, exemplary embodiments of the system are shown at 500, 600, 700, 800, 900, 1000, and 1100, respectively. The systems are substantially the same as the above-referenced system 100, and consequently the same reference numerals but indexed to their respective figure numbers are used to denote structures corresponding to similar structures in the system. In addition, the foregoing description of the system 100 is equally applicable to the systems in FIGS. 5-11, except as noted below. Moreover, it will be appreciated upon reading and understanding the specification that aspects of the systems may be substituted for one another or used in conjunction with one another where applicable.

Figure 5:
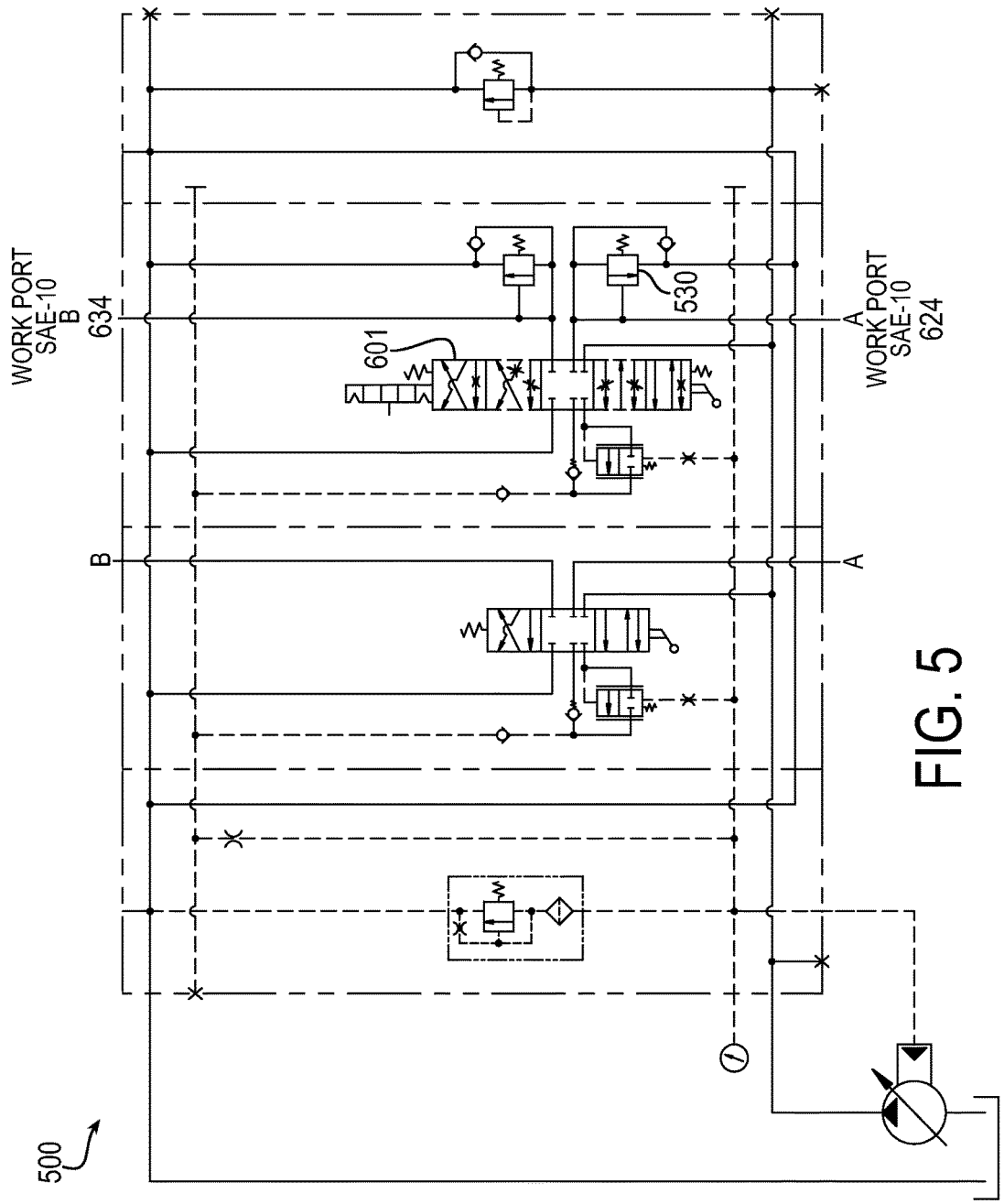
FIG. 5 shows a manually actuated abbreviated version of an exemplary PLQ SPOOL system having PLQ functionality at both workports.

FIG. 5 shows a schematic of a manually actuated abbreviated version of an exemplary PLQ SPOOL system 500 having PLQ functionality at both workports.

Figure 6:
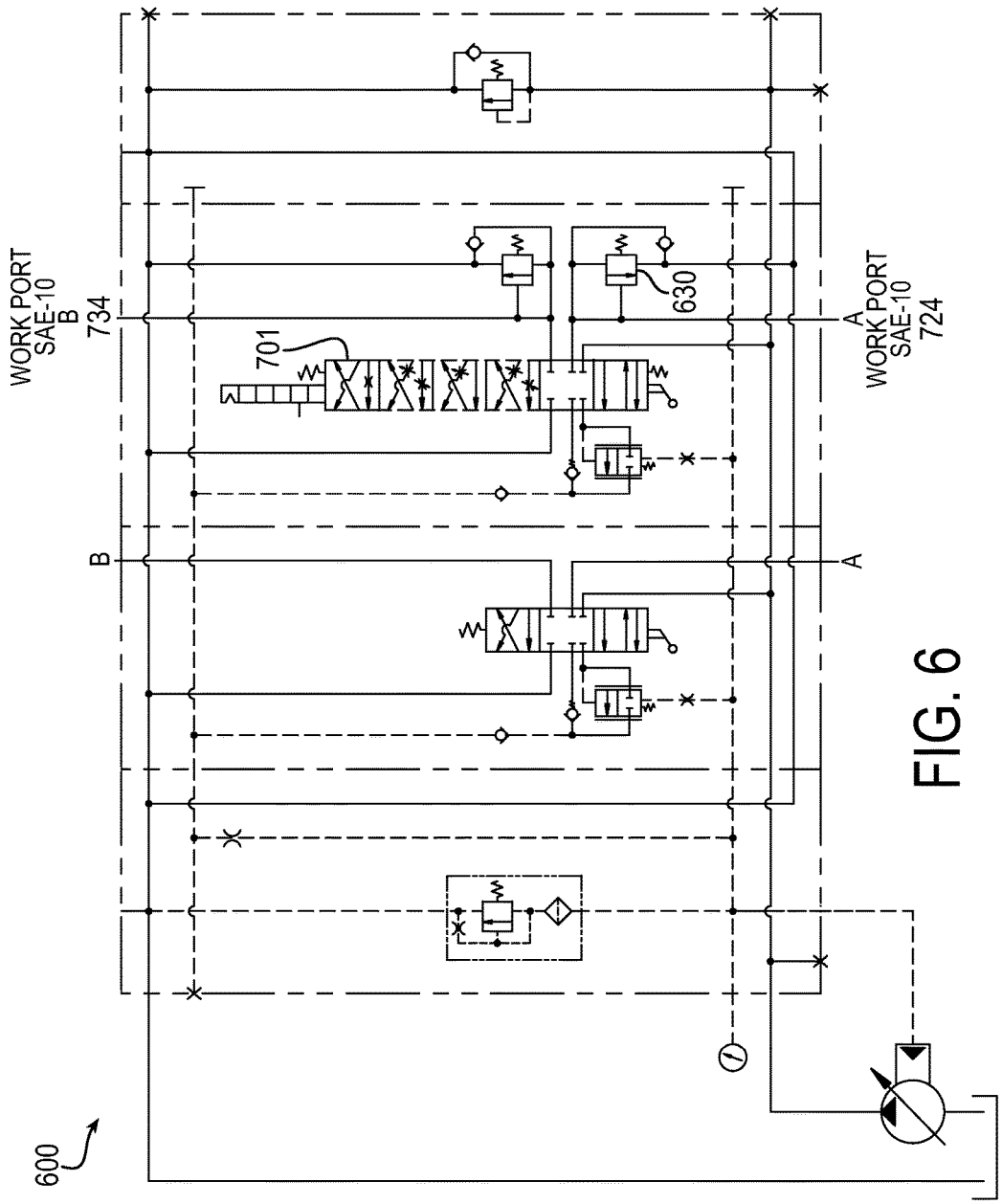
FIG. 6 shows a manually actuated full version of an exemplary PLQ SPOOL system having PLQ functionality at workport "B" and conventional functionality at workport "A"

FIG. 6 shows a schematic of a manually actuated full version of an exemplary PLQ SPOOL system 600 having PLQ functionality at workport "B" and conventional functionality at workport "A".

Figure 7:
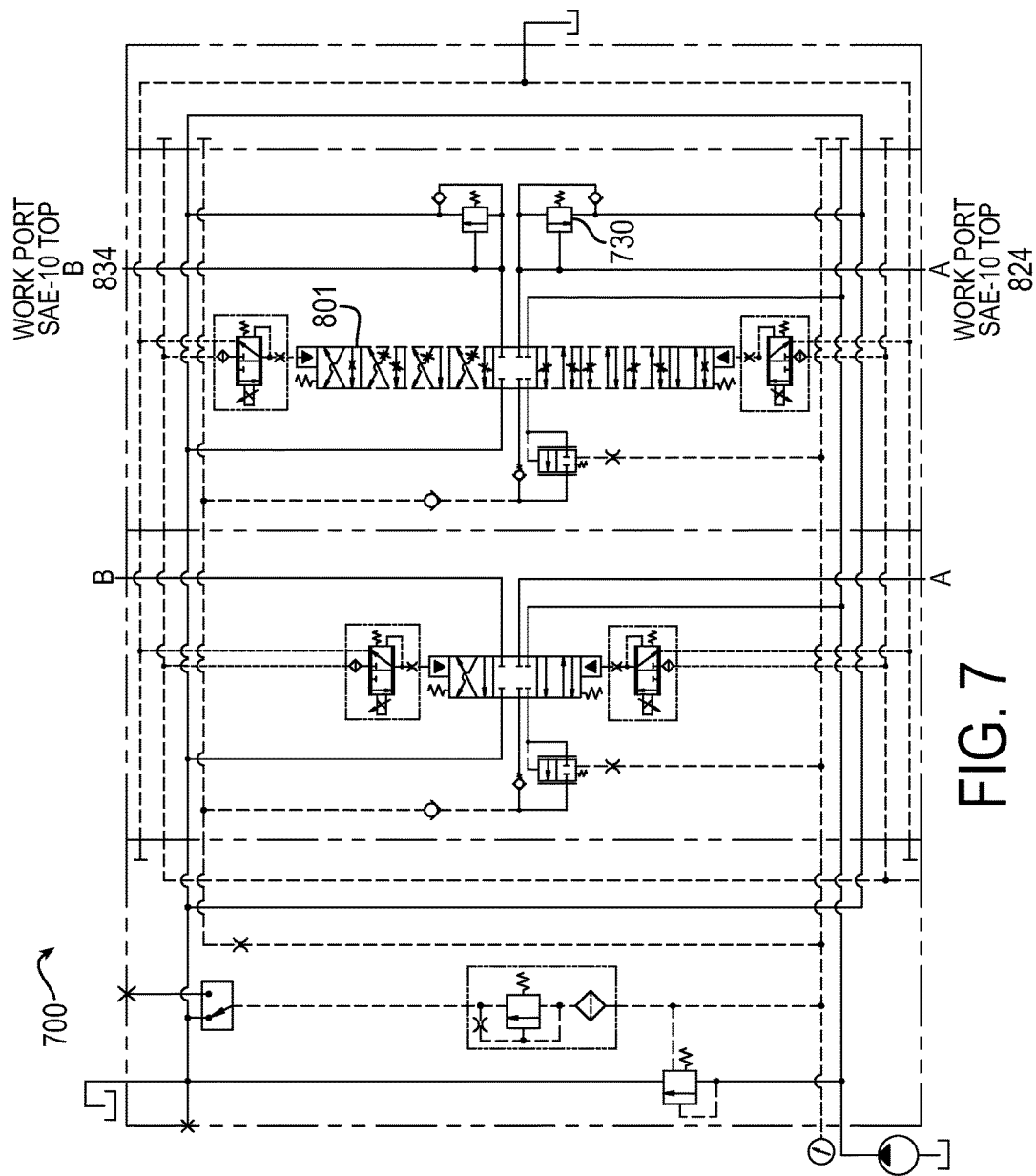
FIG. 7 shows an electro-hydraulic actuated full version of an exemplary PLQ SPOOL system having PLQ functionality at both workports.

FIG. 7 shows a schematic of an electro-hydraulically actuated full version of an exemplary PLQ SPOOL system 700 having PLQ functionality at both workports.

Figure 8:
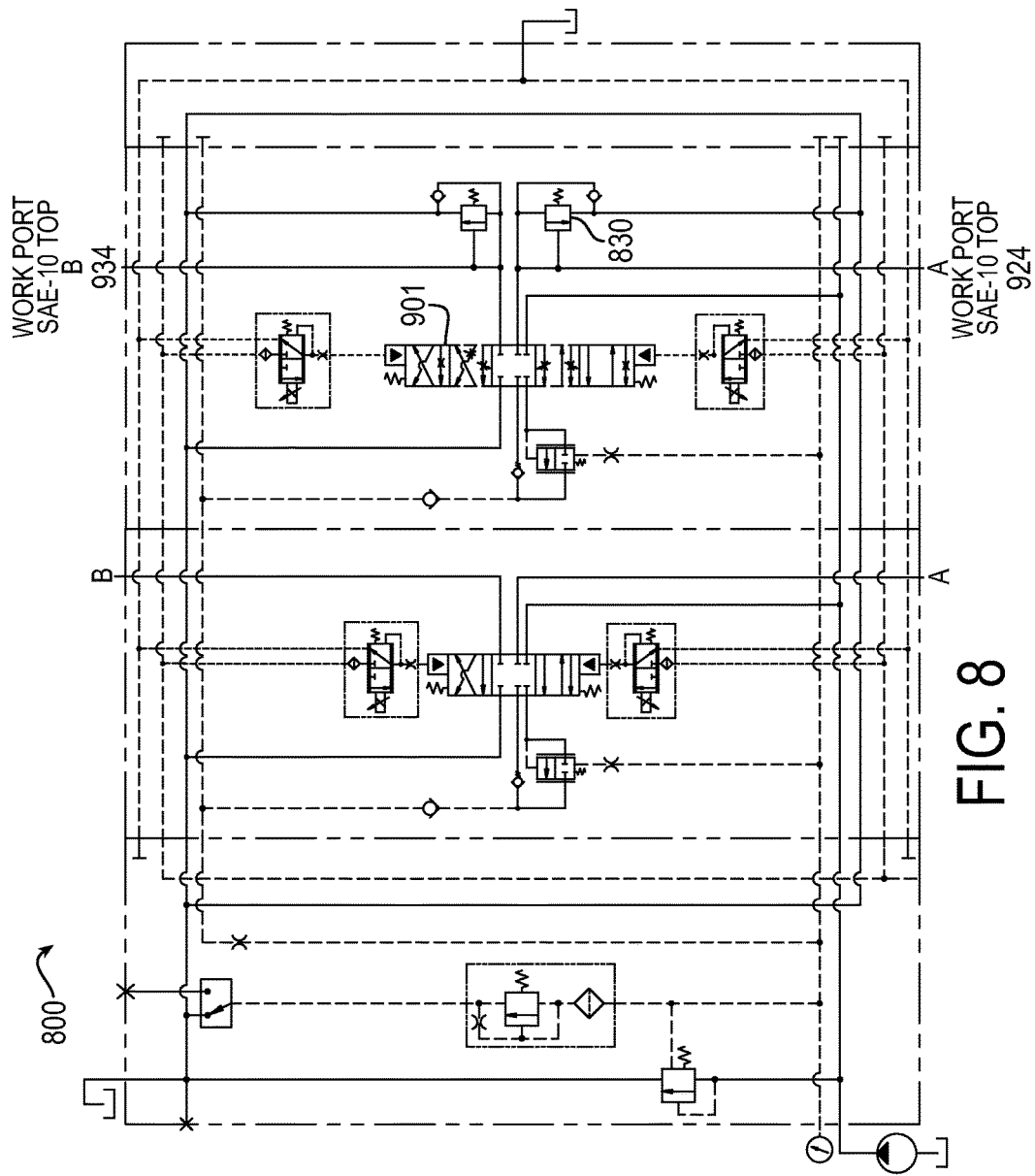
FIG. 8 shows an electro-hydraulically actuated abbreviated version of an exemplary PLQ SPOOL system having PLQ functionality at both workports.

FIG. 8 shows an electro-hydraulically actuated abbreviated version of an exemplary PLQ SPOOL system 800 having PLQ functionality at both workports.

Figure 9:
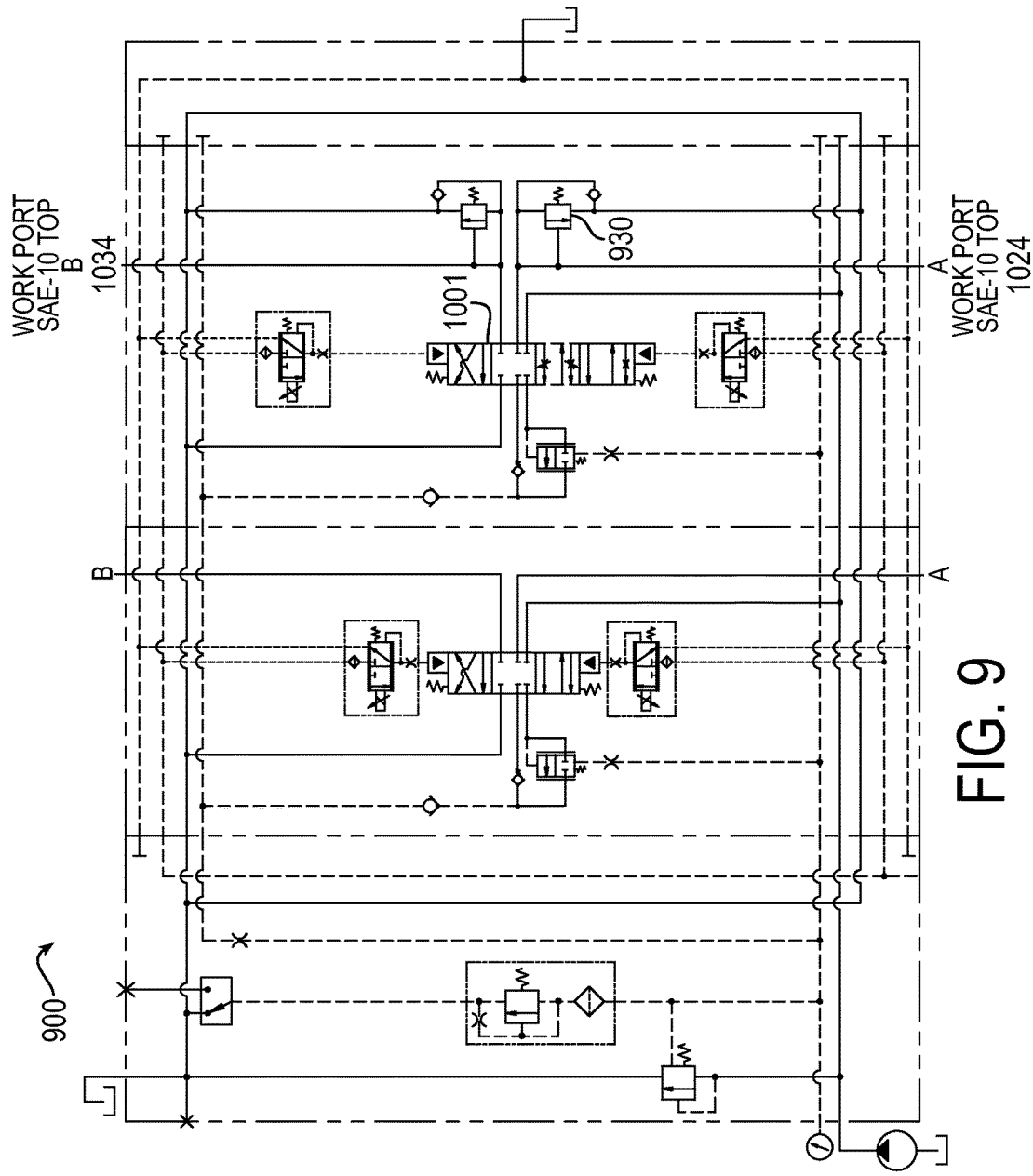
FIG. 9 shows an electro-hydraulically actuated abbreviated version of an exemplary PLQ SPOOL system having PLQ functionality at workport "A" and conventional functionality at workport "B"

FIG. 9 shows an electro-hydraulically actuated abbreviated version of an exemplary PLQ SPOOL system 900 having PLQ functionality at workport "A" and conventional functionality at workport "B".

Figure 10:
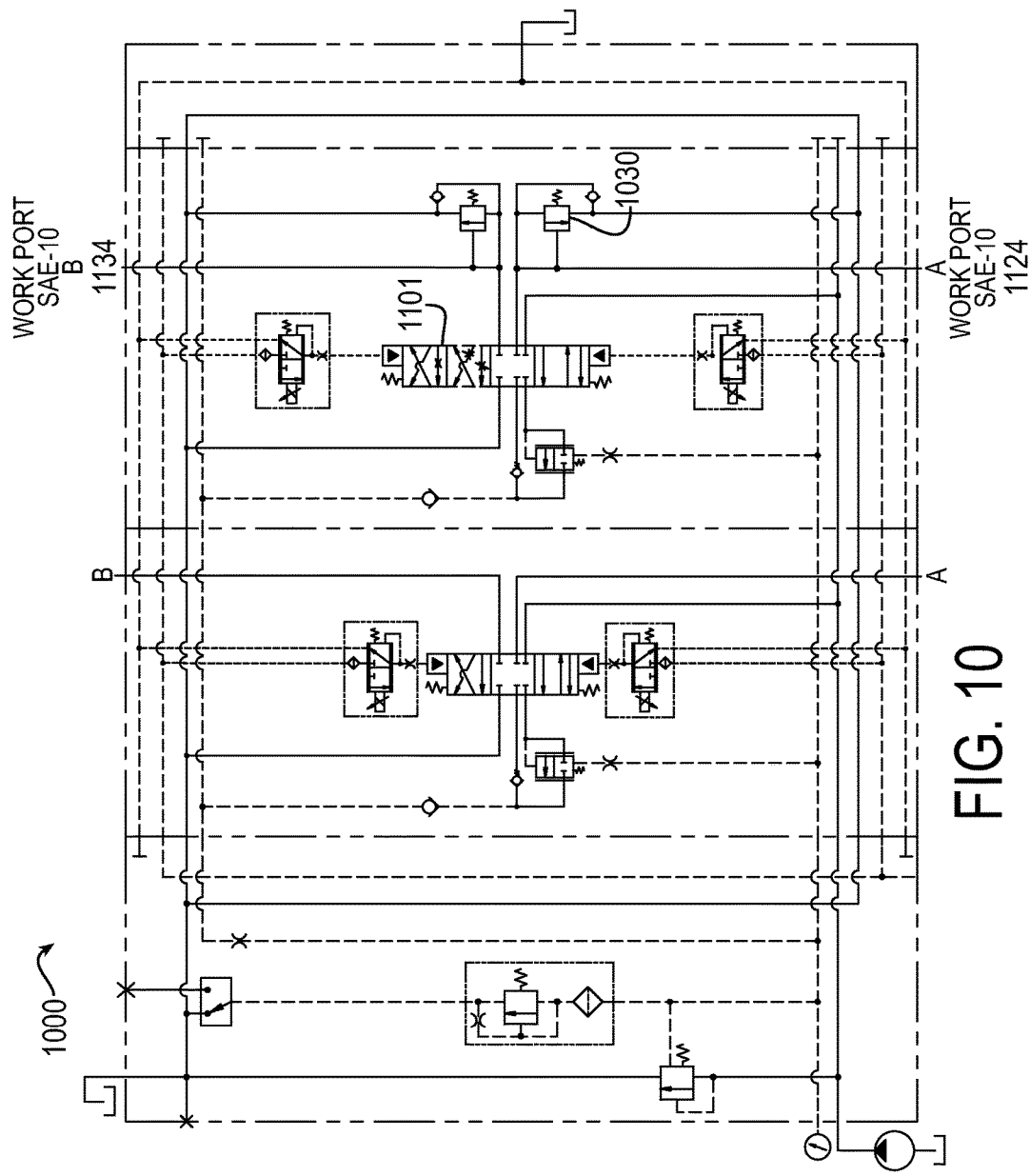
FIG. 10 shows an electro-hydraulically actuated abbreviated version of an exemplary PLQ SPOOL system having PLQ functionality at workport "B" and conventional functionality at workport "A"

FIG. 10 shows an electro-hydraulically actuated abbreviated version of an exemplary PLQ SPOOL system 1000 having PLQ functionality at workport "B" and conventional functionality at workport "A".

Figure 11:
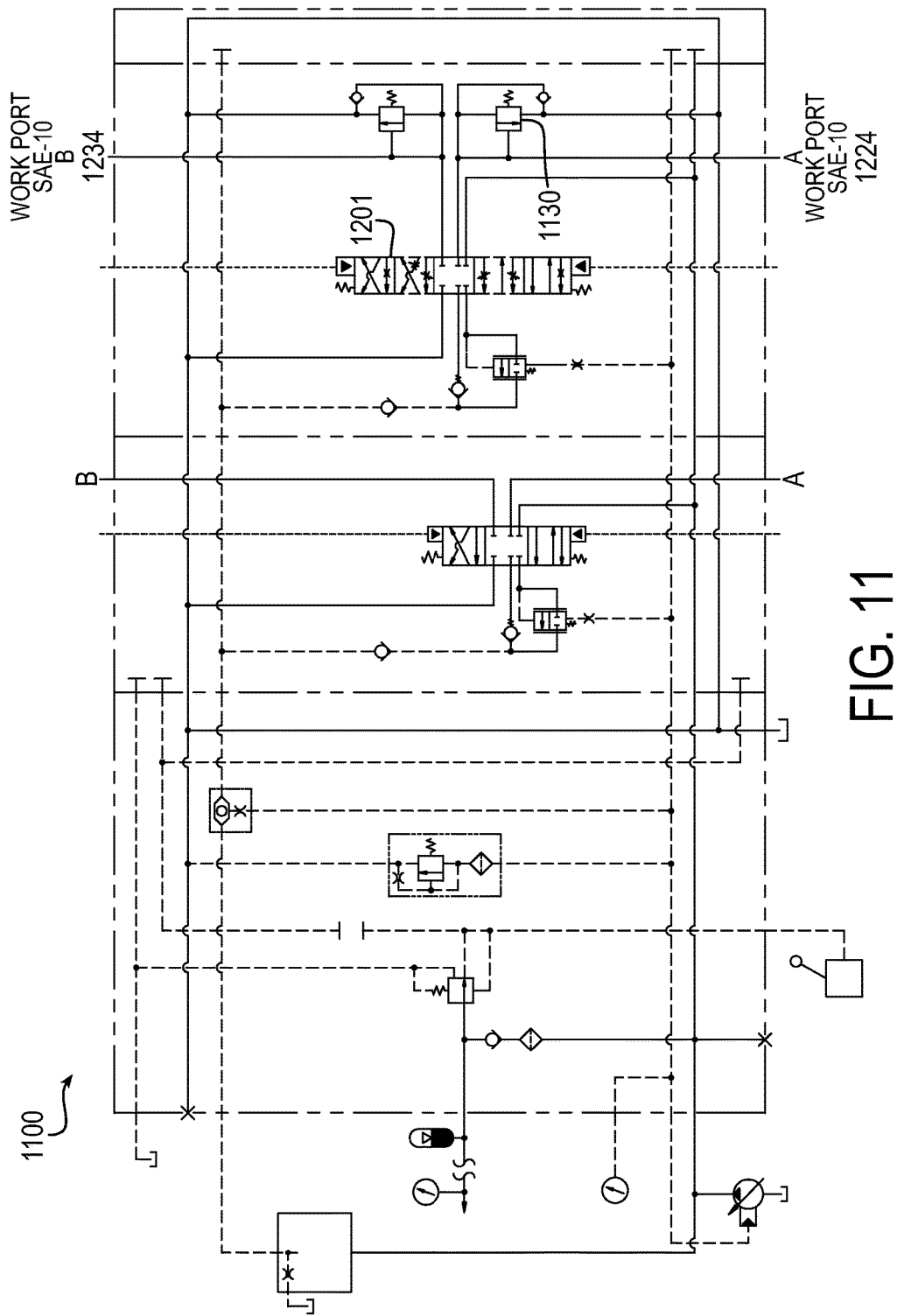
FIG. 11 shows an hydraulically remote actuated abbreviated version of an exemplary PLQ SPOOL system having PLQ functionality at both workports.

FIG. 11 shows an hydraulically remote actuated abbreviated version of an exemplary PLQ SPOOL system 1100 having PLQ functionality at both workports.

The flow sharing post pressure compensator design is capable of regulating the Maximum and Pilot flows. Workport shock pressure dissipation and lower Pilot flow meterability are attributes of the relief valve design. When approximately fully actuated (for example, from about 88%-100% of maximum actuation), the PLQ SPOOL system will limit workport pressure to a preset value less than the maximum hydraulic system pressure using only pilot flow without negatively consuming system flow, causing heat generation, and wasting energy. Exemplary applications for use with the PLQ SPOOL are those that require a constant force or torque such as a clamp. The preset pressure limitation will behave as a conventional workport relief valve when the PLQ SPOOL is less than fully actuated. It gives Load Sense and Flow Sharing Post Pressure Compensated control valves a feature to compete with a Pre Pressure Compensated valve device.

Figure 12A:
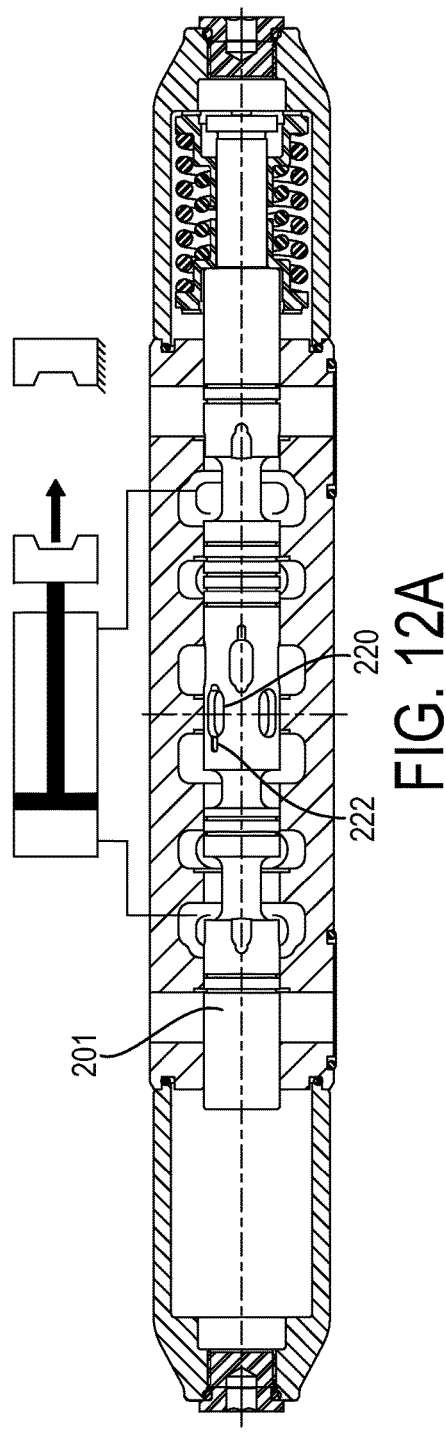
Figure 12B:
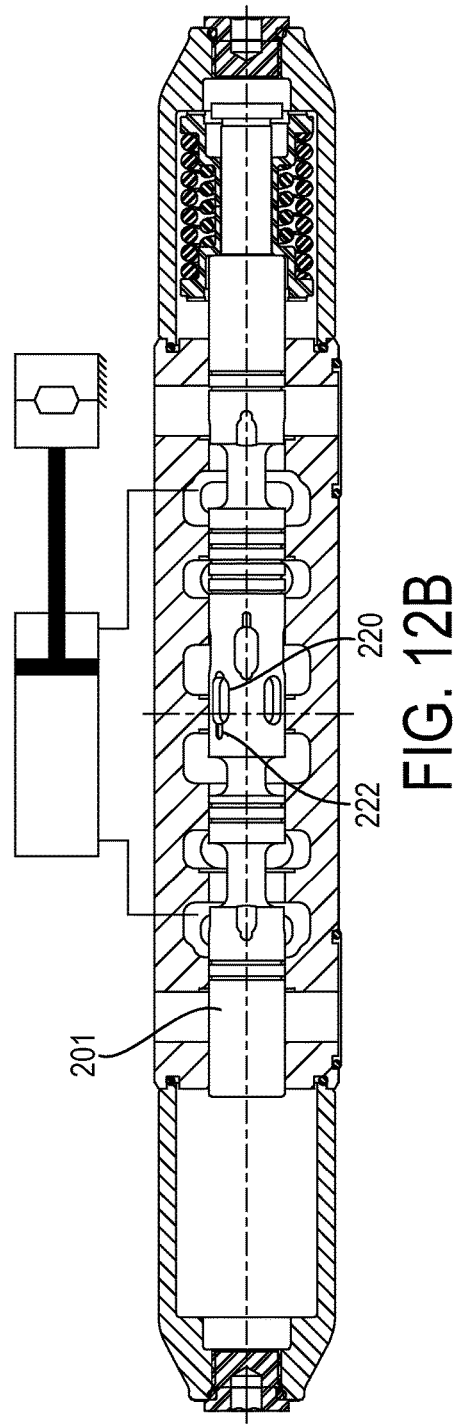
Figure 13:
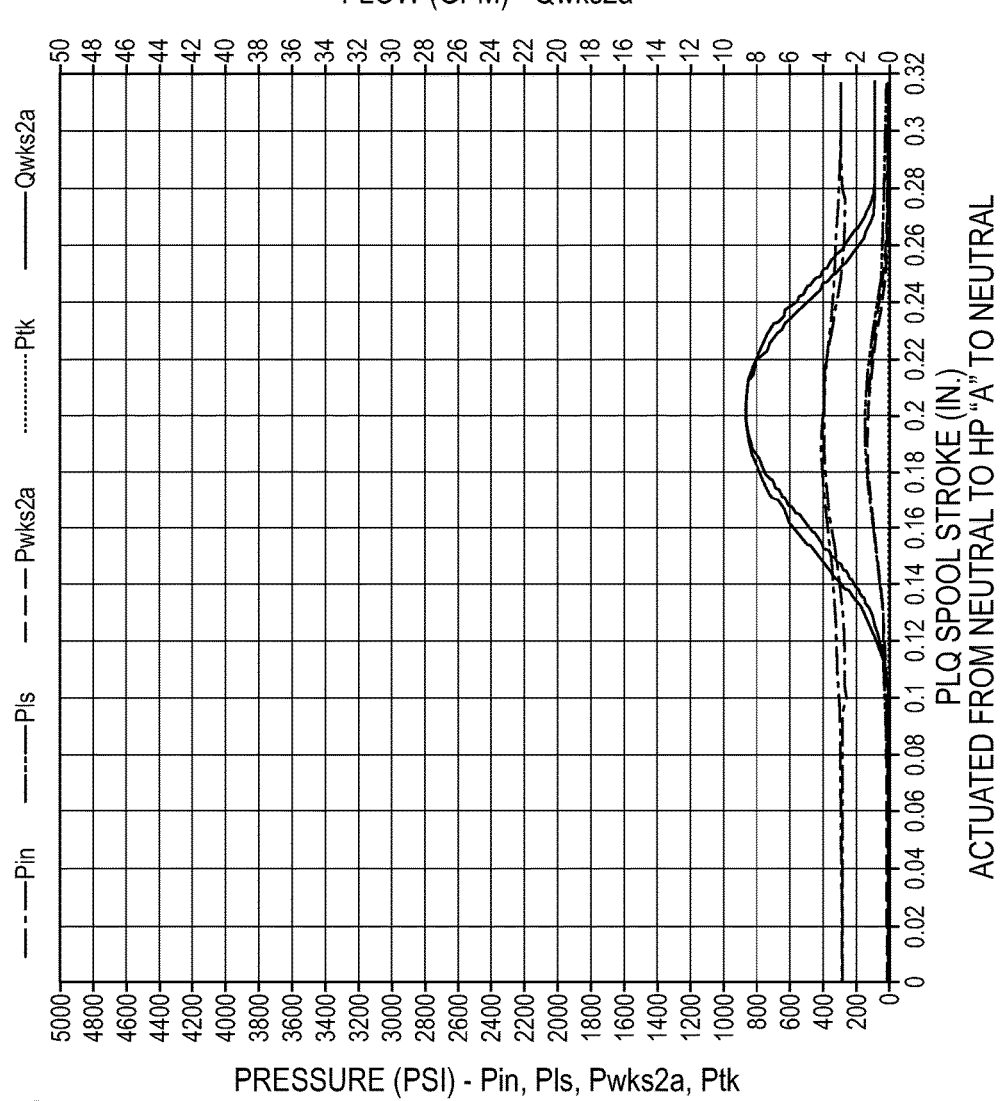
FIG. 13 shows an exemplary performance graph of a PLQ SPOOL worksection metering example.
Figure 14:
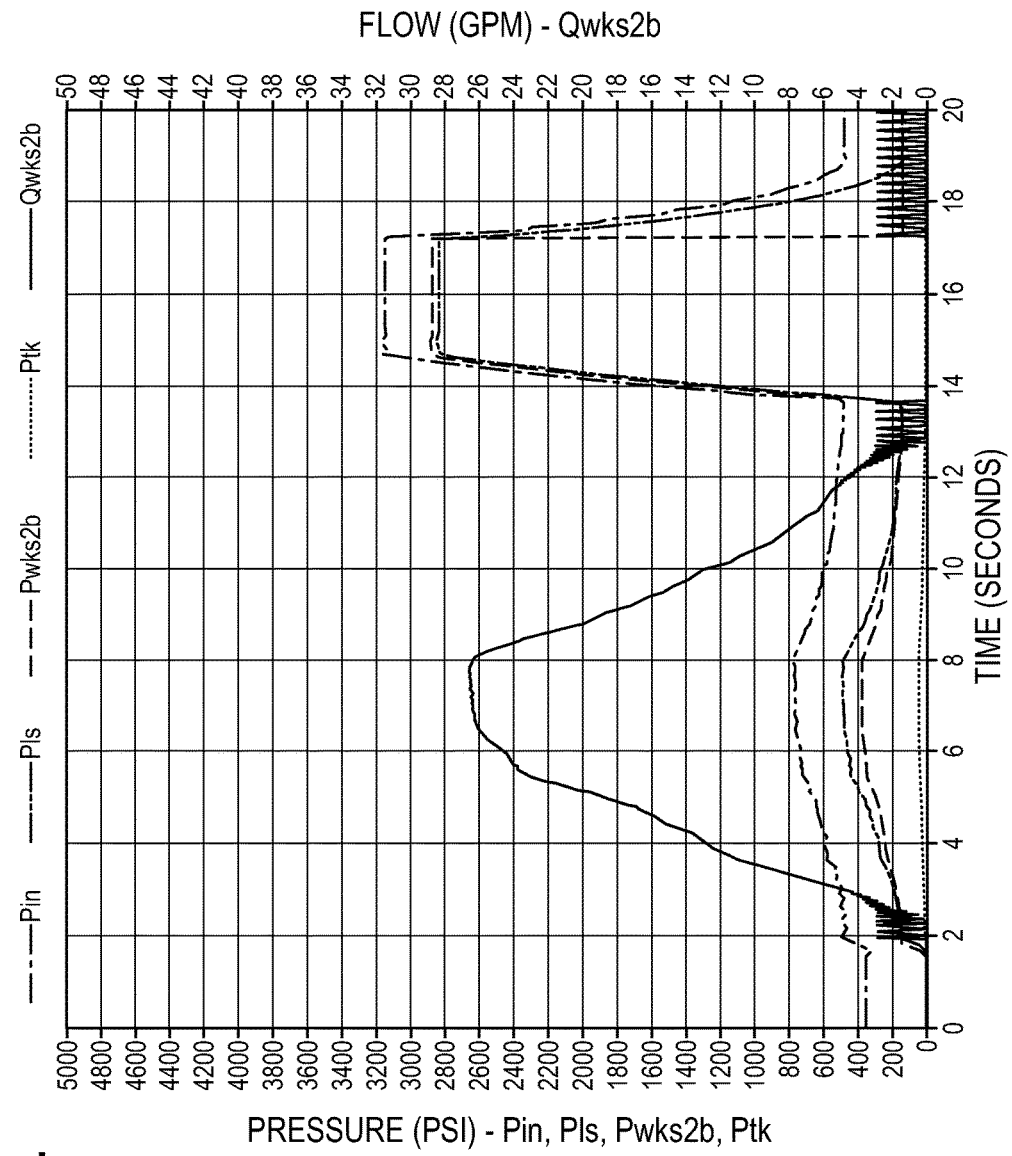
FIG. 14 shows an exemplary performance graph of a PLQ SPOOL that meters an actuator to a stalled state.

In some applications, PLQ SPOOL can be metered to output a selected Maximum flow and further metered to slow and control actuator impact at deadhead. Referring now to FIGS. 12-14, upon stalling the actuator (e.g., hydraulic cylinder or motor), the control spool can be advanced fully into detent (mechanical, hydraulic pressure, or electromagnetic) to engage the deadhead meter notches and take advantage of the reduced (for example, 0.9 gpm) pilot flow pressure limitation to control the applied force or torque. The energy conserving and negligible reduced pilot consumption lets essentially all the pump flow be used by other functions in the system. For a spool stroke less than full, pressure limitation is controlled by the workport relief valve by exhausting partial or the Maximum flow demanded by the control spool to tank. For partial flow, the remaining flow will go to the actuator. Flow to the actuator will increase as the workport pressure reduces as a function of the workport relief valve pressure override characteristic. Worksection flow demand will be reduced to the (e.g., 0.9 gpm) pilot flow once the spool is fully stroked. Once again, pressure limitation is controlled by the workport relief valve by exhausting partial or all the pilot flow to tank. For partial flow, the remaining flow will go to the actuator (for example, to replace leakage flow). Flow to the actuator will increase as the workport pressure reduces as a function of the workport relief valve pressure override characteristic. It is best suited if the actuator retracted-to-stalled transition distance is short. See the hydraulic cylinder and clamp situation of FIG. 12A-12C. The selected Maximum flow value can be, for example, 4-32 gpm, resulting in a ratio of maximum flow to pilot flow of between about 4:1 to about 36:1, although other flow ratios are possible. FIG. 14 shows example results from such an operation.

Figure 15:
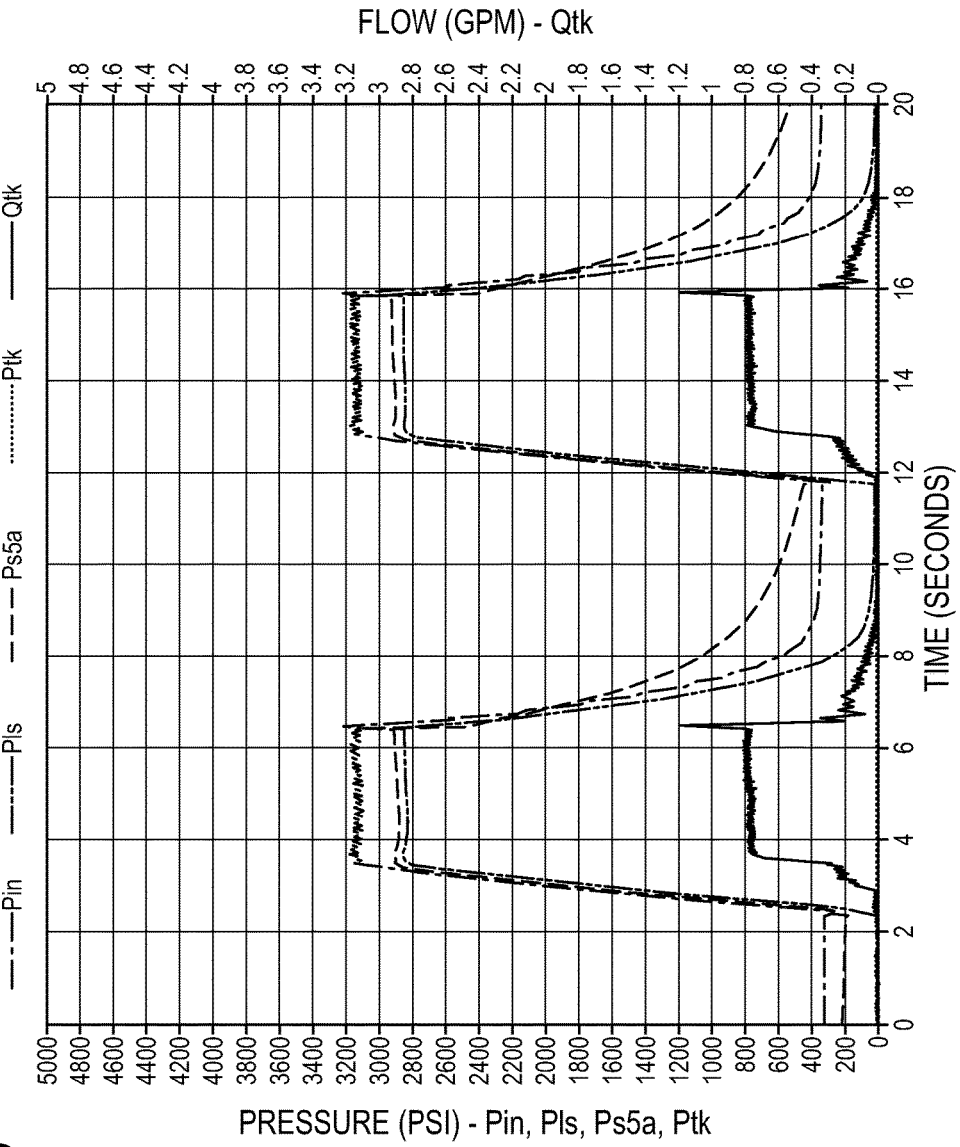
FIG. 15 shows an exemplary performance graph of a PLQ SPOOL worksection that limits workport pressure when suddenly actuated to deadhead condition.

In other applications, PLQ SPOOL may be suddenly and fully actuated from neutral into detent. Referring to FIG. 15, maximum flow output is skipped. The actuator will advance based on the selected Pilot Flow, and the workport will pressure limit upon achieving the pressure setting. Pilot Flow is the workport flow output when the actuator approaches or transitions to and during the deadhead state. Although 0.9 gpm Pilot flow at full spool stroke is standard, other pilot flow values (for example, 0.9 4.0 gpm) are available.

PLQ SPOOL control spool stroke from the neutral position to the maximum high pressure A and B positions (HP"A", HP"B") and flow passage locations may be important. Shorter spool stroke prohibits having an ample "Maximum" flow, Flow Meterability before and after the "Maximum" flow region, adjustability of Pilot flow, and adequate sealing overlap between high and low pressure cavities in the Neutral, HP"A", and HP"B" positions. There must be adequate length for the Deadhead meter notches to engage, demand the reduced Pilot Flow, and be tolerance resistant near the end of stroke. See FIG. 13 for an example of operating characteristics.

Pressure compensator and workport relief valve designs should be able to acceptably compensate and pressure limit the low pilot flow, respectively. The post pressure compensator design should regulate the maximum and pilot flows. The workport relief valve should provide shock pressure dissipation in addition to pilot flow meterability.

An exemplary application for exemplary PLQ SPOOL is a snow plow salt spreader truck (Plow Blade Elevation), which may use regulated pressure to generate upward force to counter gravity acting on the blade in order to maintain elevation. Further, a snow plow salt spreader truck (Scraping with Plow) may use regulated pressure to control the force of the plow blade against the ground. Still further, forestry skidder, loader, feller, buncher machines (Clamping and Retaining Logs) may use regulated pressure to control the clamping force of the tongs against the logs or trees while they are being moved. Moreover, stamping, molding machines (Maximum Press) may use regulated pressure to control the force of a ram against the part being made. Additionally, a construction excavator (Swing) may require rapid rotational acceleration which can be controlled by limiting torque on a rotary motor. Further, impact sensitive and/or automated applications may include a machine actuator that could be accelerated to reduce transition time with PLQ SPOOL maximum flow. Then the actuator can be decelerated by advancing PLQ SPOOL to the pilot flow stage to reduce impact and provide the reduced pilot flow pressure limitation when stalling the actuator. A computer program could manage this process if the PLQ SPOOL worksection is configured with standard hydraulic remote (HR) or electrohydraulic (EH) spool positioners.

Exemplary PLQ SPOOL systems as described herein are simple, low cost solutions providing a special spool in an environment that may be otherwise conventional. Individual and adjustable workport A and B pressure settings are easily achieved. Standard workport relief valve (RV) is used to limit workport pressure using a small pilot flow. Standard workport RV provides workport shock suppression in addition to its pilot flow pressure limitation function. A conventional low cost pressure compensator can be used. Pressure limitation fits into a standard worksection assembly and is a compact package. Response to Limit Workport Pressure commands is fast because the pressure compensator is not pilot operated and the workport relief valve is of a direct acting type. The worksection "control spool position to housing bore relationship" is configured to provide a "Maximum" workport output flow in addition to an energy saving "Pilot" flow used in the final pressure limited flow stage. High "Maximum" flow (e.g., 32 gpm) capacity generated by a low pressure differential distinguishes and emphasizes the benefits of this design. Exemplary spools works with both of the common flow sharing post pressure compensator types: a) a compensator with isolated pressure signal end chambers, and b) a compensator with an isolated load sense pressure signal end chamber and a non-isolated pressure signal end exposed to inlet metered flow. Small diameter dampening or flow limiting orifices may not be required in the PLQ SPOOL worksection assembly.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pressure limiting flow spool assembly comprising:
a valve body having a first fluid chamber separated from a second fluid chamber by a dividing portion, and a bore fluidly connected to the first and second fluid chambers and adjacent the dividing portion; and
a pressure limiting flow spool disposed in the bore and axially movable from a neutral position to a first axial position in a first direction and from the first axial position to a second axial position in the first direction in the valve body, wherein the second axial position is closer in distance to a full stroke position of the spool than the first axial position;
wherein in the neutral position, the spool fluidly disconnects the first and second fluid chambers,
wherein axial movement of the spool to the first axial position causes the spool to form with the dividing portion a first fluid passageway fluidly connecting the first fluid chamber with the second fluid chamber, and
wherein axial movement of the spool to the second axial position causes the spool to form with the dividing portion a second fluid passageway fluidly connecting the first fluid chamber with the second fluid chamber, and wherein the first fluid passageway is larger than the second fluid passageway, such that the first fluid passageway has a greater flow capacity between the first fluid chamber and the second fluid chamber than the second fluid passageway.

2. The pressure limiting flow spool assembly of claim 1, wherein the spool includes a first recess on a radially outer surface of the spool, and a second recess on the radially outer surface of the spool connected to the first recess, and wherein the first recess forms the first fluid passageway and the second recess forms the second fluid passageway.

3. The pressure limiting flow spool assembly of claim 2, wherein the first recess is radially deeper than the second recess.

4. The pressure limiting flow spool assembly of claim 2, wherein the first recess is circumferentially wider than the second recess.

5. The pressure limiting flow spool assembly of claim 1, wherein the first fluid chamber includes a valve inlet of the spool assembly.

6. The pressure limiting flow spool assembly of claim 1, wherein the second fluid chamber includes a pressure compensator.

7. The pressure limiting flow spool assembly of claim 1, further comprising a spool detent mechanism configured to hold the spool in the second axial position.

8. The pressure limiting flow spool assembly of claim 1, wherein the valve body includes a feed chamber and a first workport chamber and wherein the spool includes a first workport passage fluidly connecting the feed chamber to the first workport chamber when the spool is in the first or second axial position.

9. The pressure limiting flow spool assembly of claim 1, wherein the spool is moveable to fourth and fifth axial positions,
wherein in the fourth axial position, the spool forms with the dividing portion a third fluid passageway fluidly connecting the first fluid chamber with the second fluid chamber, the third fluid passageway having the greater flow capacity between the first and second fluid chambers, and
wherein in the fifth axial position, the spool forms with the dividing portion a fourth fluid passageway fluidly connecting the first fluid chamber with the second fluid chamber, the fourth fluid passageway having a reduced flow capacity.

10. The pressure limiting flow spool assembly of claim 9, wherein the valve body includes a second workport chamber and wherein the spool includes a second workport passage fluidly connecting a feed chamber to the second workport chamber when the spool is in the fourth or fifth position.

11. The pressure limiting flow spool assembly of claim 1, wherein flow capacity of the second fluid passageway is approximately 0.9 gallons per minute.

12. The pressure limiting flow spool assembly of claim 1, wherein a ratio between flow capacity of the first fluid passageway and respective flow capacity of the second fluid passageway is a ratio of between approximately 4:1 to 36:1.

13. The pressure limiting flow spool assembly of claim 1, wherein the second axial position is the full stroke position of the spool.

14. The pressure limiting flow spool assembly of claim 1, further including a pressure compensator fluidly connected between the second fluid chamber and a third chamber.

15. The pressure limiting flow spool assembly of claim 1, further including a relief valve fluidly connected and operable in parallel to an output of a workport chamber.

16. A hydraulic valve assembly comprising:
a pressure limiting flow spool disposed in a valve body, the spool axially movable in a first direction from a first axial position to a second axial position and in the first direction from the second axial position to a third axial position, wherein the third axial position is closer in distance to a full stroke position of the spool than the second axial position, wherein the spool includes a first recess on a radially outer surface of the spool, and wherein the spool includes a second recess on the radially outer surface of the spool, wherein the second recess is connected to the first recess; and
an inlet and a first outlet,
wherein the first axial position is a closed position preventing flow from the inlet to the first outlet, wherein axial movement of the spool to the second axial position causes the first recess to form a first fluid passageway, wherein axial movement of the spool to the third axial position causes the second recess to form a second fluid passageway, and wherein the first recess is larger than the second recess, such that the first fluid passageway has a greater flow capacity between the inlet and the first outlet than the second fluid passageway.

17. The hydraulic valve assembly of claim 16, further comprising:
a relief valve fluidly connected and operable in parallel with the first outlet.

18. The hydraulic valve assembly of claim 16, further including a pressure compensator between the inlet and the first outlet.

19. The hydraulic valve assembly of claim 16, further comprising a second outlet; and
wherein the spool is movable in a second direction from the first axial position to a fourth axial position and from the fourth axial position to a fifth axial position, wherein the fourth axial position allows the greater flow capacity from the inlet to the second outlet, and the fifth axial position allows a reduced flow capacity from the inlet to the second outlet smaller than the greater flow capacity allowed by the fourth axial position.

20. The hydraulic valve assembly of claim 16, wherein the third axial position is a full stroke position.

* * * * *